United States Patent
Machida et al.

(10) Patent No.: US 7,398,761 B2
(45) Date of Patent: Jul. 15, 2008

(54) KNOCKING CONTROL DEVICE FOR MULTICYLINDER ENGINE

(75) Inventors: Kenichi Machida, Saitama (JP); Masashi Furuya, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/806,183

(22) Filed: May 30, 2007

(65) Prior Publication Data

US 2007/0277781 A1 Dec. 6, 2007

(30) Foreign Application Priority Data

Jun. 2, 2006 (JP) ............... 2006-155173

(51) Int. Cl.
*F02P 5/15* (2006.01)
*G06F 19/00* (2006.01)
(52) U.S. Cl. ................... 123/406.37; 701/111
(58) Field of Classification Search ............ 123/406.37, 123/406.3, 406.35, 406.21; 701/111
See application file for complete search history.

(56) References Cited

U.S. PATENT DOCUMENTS 4,471,736 A * 9/1984 Yoshida et al. ......... 123/406.21
4,483,179 A * 11/1984 Oshima et al. ............. 73/35.13
4,700,677 A * 10/1987 Bonitz et al. ........... 123/406.16
5,215,058 A * 6/1993 Sakakibara et al. .... 123/406.38
7,159,565 B2 * 1/2007 Demura et al. ......... 123/406.47

FOREIGN PATENT DOCUMENTS

| JP | 59-25081 A | * | 2/1984 |
| JP | 62-51758 | * | 3/1987 |
| JP | 3-164552 A | * | 7/1991 |
| JP | 2002-155795 A | | 5/2002 |

* cited by examiner

*Primary Examiner*—Hieu T Vo
(74) *Attorney, Agent, or Firm*—Birch, Stewart, Kolasch & Birch, LLP

(57) ABSTRACT

To reliably prevent knocking in all of the cylinders of a multicylinder engine by detecting an output signal from a knock sensor provided for only one of the cylinders. A cylinder barrel is formed with a knock sensor base on the side surface of only the third cylinder and a vibration type knock sensor is mounted on the knock sensor base. A water jacket is formed in an upper portion of the wall of the cylinder barrel. The knock sensor base is formed below the water jacket so as to prevent a problem such that knocking vibrations may be absorbed by the cooling water in the water jacket to cause a reduction in sensitivity of the knock sensor.

20 Claims, 9 Drawing Sheets

KNOCKING CONTROL DEVICE FOR MULTICYLINDER ENGINE

CROSS-REFERENCE TO RELATED APPLICATIONS

The present application claims priority under 35 USC 119 to Japanese Patent Application No. 2006-155173 filed on Jun. 2, 2006 the entire contents of which are hereby incorporated by reference.

BACKGROUND OF THE INVENTION

1. Field of the Invention

The present invention relates to a knocking control device for a multicylinder engine. More particularly to a knocking control device for a multicylinder engine which can reliably control knocking in all of the cylinders of the engine by providing a single knock sensor for any one of the cylinders.

2. Description of Background Art

It is known that when the ignition timing of an internal combustion engine is earlier than a fundamental ignition timing, an output from the engine is increased, but knocking is prone to occur. Accordingly, the engine output can be improved by advancing the ignition timing from the fundamental ignition timing in such a correction range that knocking does not occur. Conventionally, a knock sensor is used to detect the occurrence of knocking, and the ignition timing is advanced in the range that knocking does not occur, thereby improving the engine output.

However, a knock sensor is expensive, so that if a plurality of knock sensors are respectively provided for all of the cylinders of a multicylinder engine, an increase in cost of a vehicle having the engine is invited. More particularly in a compact vehicle, the space around the engine is limited, so that there is a case where it is difficult to ensure an installation space for each knock sensor or there is a case where the installation space for each knock sensor may cause a large limitation to the layout of other parts. Further, such a problem becomes more remarkable with an increase in number of the cylinders of the multicylinder engine.

In relation to this problem, Japanese Patent Laid-open No. 2002-155795 discloses a technique for detecting the occurrence of knocking in a multicylinder engine by using a single knock sensor.

Vibrations are produced in the engine by various factors. Accordingly, in performing knocking control such that the occurrence of knocking is detected according to vibrations produced in the engine, it is desirable to provide a knock sensor on the side surface of a cylinder block in order that knocking vibrations can be selectively detected. Accordingly, in the case of detecting the occurrence of knocking in a multicylinder engine by using a single knock sensor, it is important to consider the location of the knock sensor to be provided in the vicinity of any one of the cylinders.

In Japanese Patent Laid-open No. 2002-155795, however, although the occurrence of knocking in the multicylinder engine is detected by using the single knock sensor, the consideration on the location of the knock sensor is insufficient.

SUMMARY AND OBJECTS OF THE INVENTION

It is accordingly an object of the present invention to provide a knocking control device for a multicylinder engine which can reliably prevent knocking in all of the cylinders of the engine by detecting an output signal from a single knock sensor provided for only one of the cylinders.

The present invention has the following features in a knocking control device for controlling knocking in a multicylinder engine having a plurality of cylinders.

In accordance with an embodiment of the present invention, the knocking control device includes a knock sensor located so as to correspond to a specific one of the cylinders with advance correcting means for advancing the ignition timing for the specific cylinder as compared with the ignition timing for the other cylinders. A knocking detecting means is provided for detecting knocking according to an output signal from the knock sensor. A retard correcting means is provided for retarding the ignition timing for each cylinder when knocking is detected.

In accordance with an embodiment of the present invention, the multicylinder engine is an in-line engine, and the specific cylinder is any one of the cylinders of the in-line engine other than the opposite two cylinders.

In accordance with an embodiment of the present invention, the knocking control device further includes a retard correction amount diminishing means for gradually returning the retarded ignition timing for each cylinder to the advanced ignition timing obtained before the retard correction by the retard correcting means.

In accordance with an embodiment of the present invention, the multicylinder engine has a cylinder body formed with a water jacket, and the knock sensor is mounted on the cylinder body at a position avoiding the water jacket.

In accordance with an embodiment of the present invention, the knock sensor is located below the water jacket.

In accordance with an embodiment of the present invention, the knocking detecting means includes amplitude diminishing means for diminishing the amplitude of a signal input from the knock sensor.

In accordance with an embodiment of the present invention, the amplitude diminishing means diminishes the amplitude of the input signal according to an engine speed.

In accordance with an embodiment of the present invention, the amplitude diminishing means has a diminishing rate increasing with an increase in engine speed.

According to the present invention, the following effects can be attained.

According to an embodiment of the present invention, the ignition timing for the specific cylinder is advanced from the ignition timing for the other cylinders, so that knocking occurs in the specific cylinder more easily than in the other cylinders. In other words, under the circumstances where knocking occurs in the other cylinders, knocking always occurs in the specific cylinder. Accordingly, when knocking in the specific cylinder is detected, the retard correction for each cylinder is started according to the first feature of the present invention. Thus, the occurrence of knocking in all of the cylinders can be reliably prevented by providing the knock sensor for the specific cylinder.

According to an embodiment of the present invention, the knock sensor is provided for any inner cylinder of the in-line multicylinder engine other than the two outer cylinders formed at the opposite ends of the engine. The two outer cylinders can obtain a large cooling effect by an airflow during operation. In other words, any inner cylinder other than the two outer cylinders is more susceptible to knocking. Accordingly, when knocking in any inner cylinder is detected, the retard correction for each cylinder is started according to an embodiment of the present invention. Thus, the occurrence of knocking in all of the cylinders can be reliably prevented by providing the knock sensor for the specific cylinder.

According to an embodiment of the present invention, the retarded ignition timing can be quickly returned to the reference ignition timing with the reoccurrence of knocking being prevented.

According to an embodiment of the present invention, the knock sensor is located so as to avoid the water jacket. Accordingly, it is possible to prevent a problem such that knocking vibrations may be absorbed by the cooling water to cause a reduction in sensitivity of the knock sensor.

According to an embodiment of the present invention, the knock sensor is located below the water jacket so as to be spaced apart from the inlet and exhaust valves of the engine. Accordingly, the influence of valve seating noise can be reduced.

According to an embodiment of the present invention, the amplitude of an output signal from the knock sensor can be diminished. Accordingly, by diminishing a large amplitude of the output signal from the knock sensor, optimum sensitivity can be always obtained.

According to an embodiment of the present invention, knocking in the engine whose vibrations largely change according to engine speed can be accurately detected.

According to an embodiment of the present invention, when the vibrations become larger with an increase in engine speed, causing an increase in amplitude of the output signal from the knock sensor, the diminishing rate is increased. Accordingly, optimum sensitivity can be always obtained irrespective of engine speed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
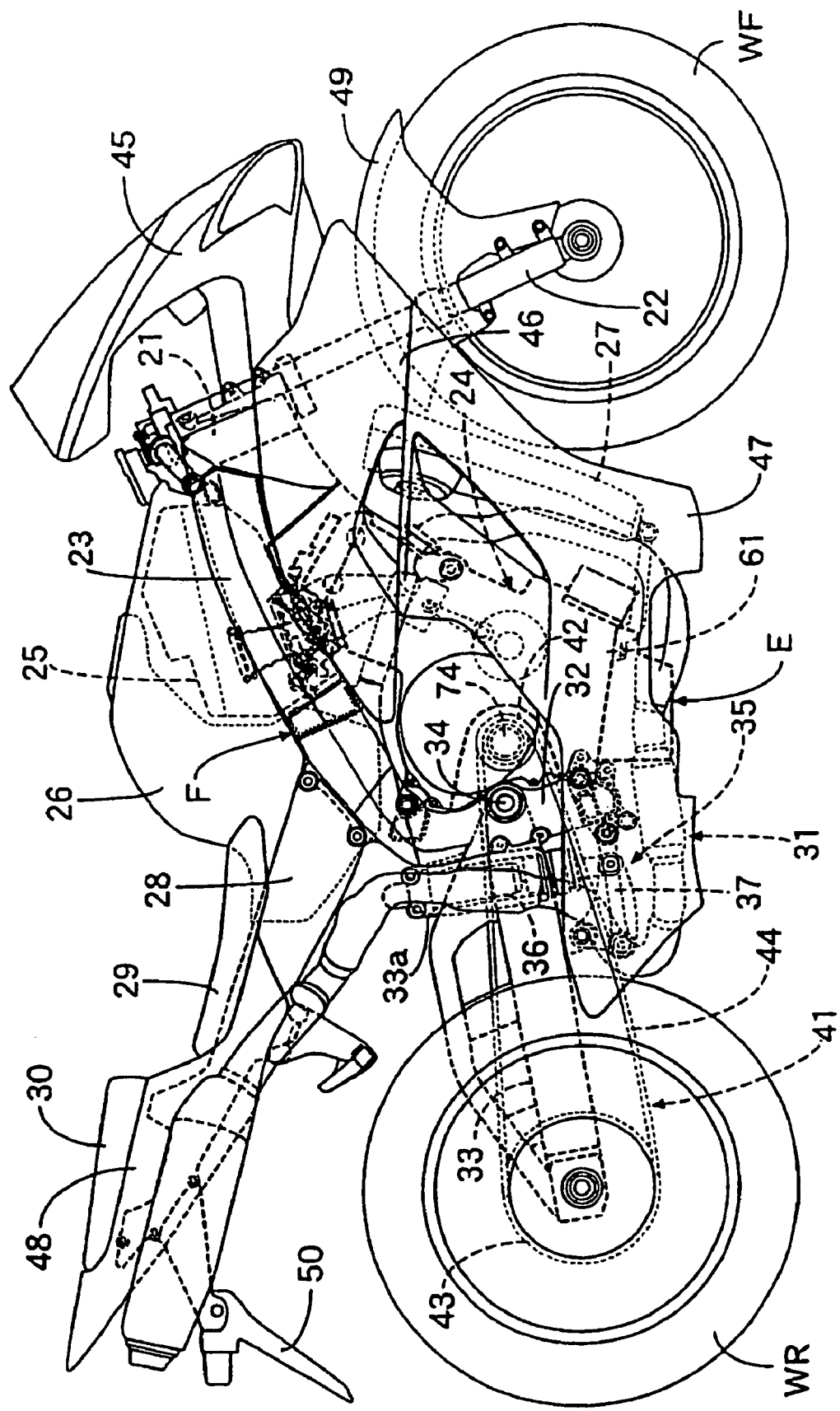
FIG. 1 is a side view of a motorcycle to which the knocking control device of the present invention is applied.
Figure 2:
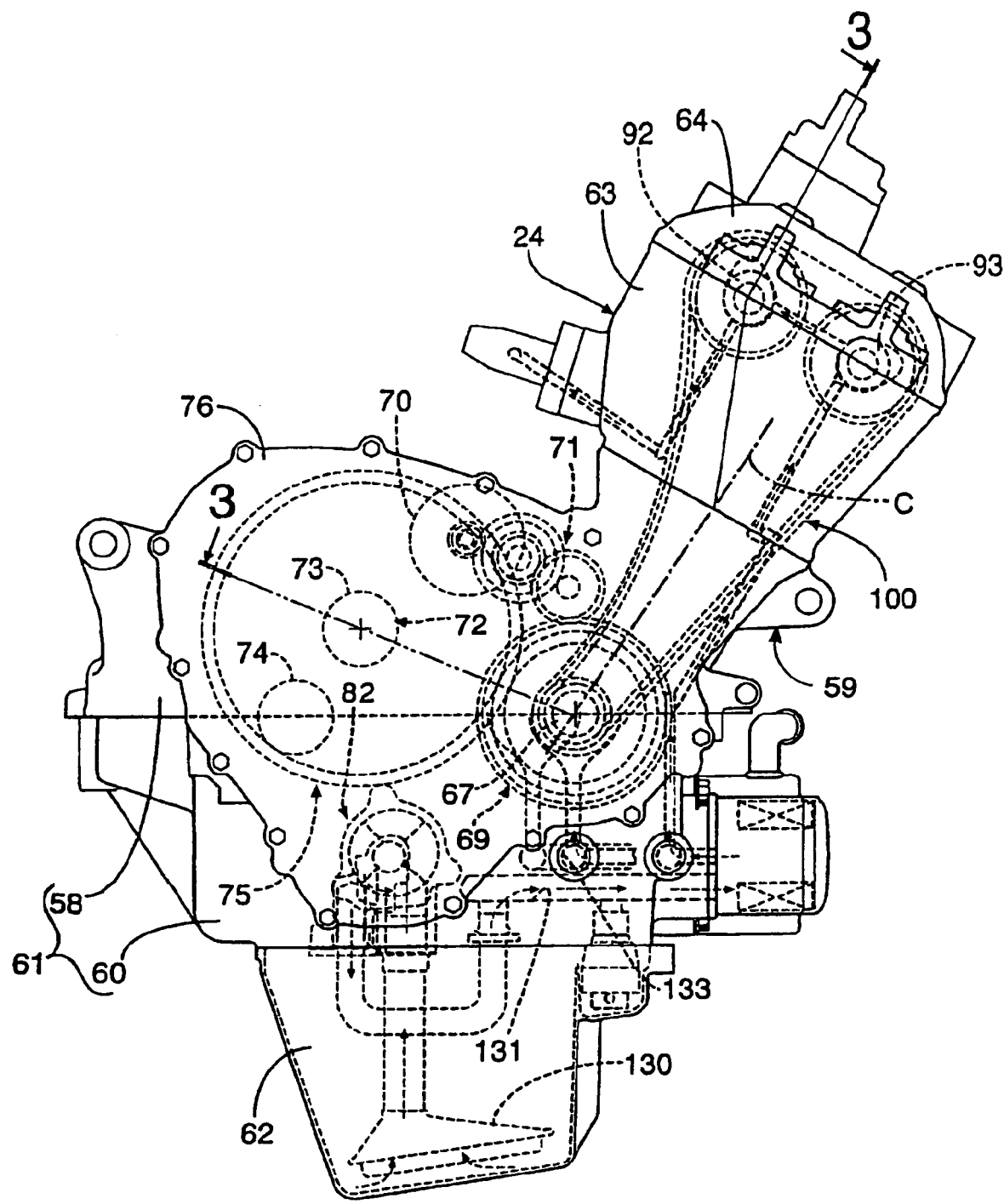
FIG. 2 is a side view of an engine mounted on the motorcycle shown in FIG. 1.
Figure 3:
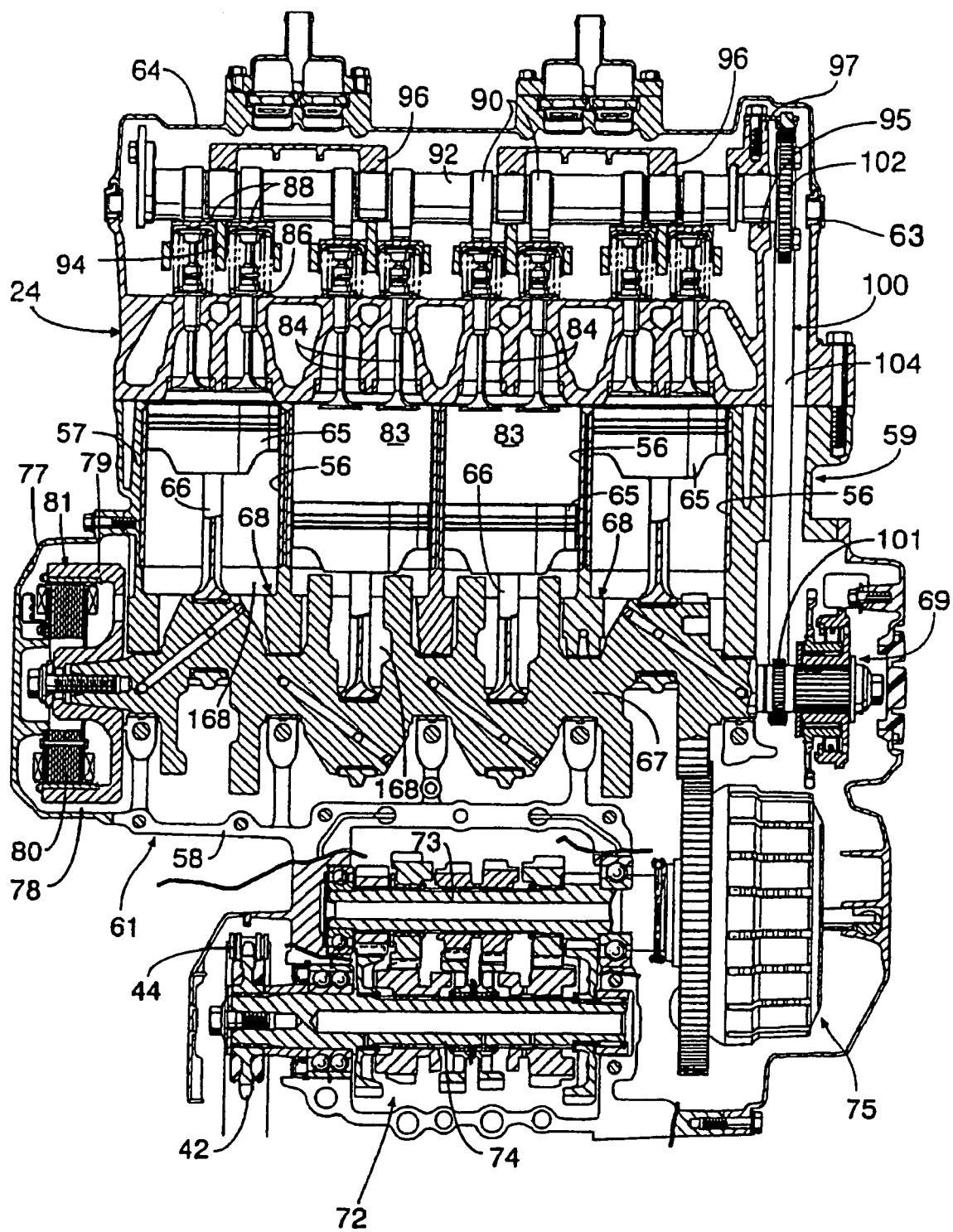
FIG. 3 is a cross section taken along the line 3-3 in FIG. 2.

A preferred embodiment of the present invention will now be described in detail with reference to the drawings. FIG. 1 is a side view of a motorcycle to which the knocking control device of the present invention is applied, FIG. 2 is a side view of an engine mounted on the motorcycle, and FIG. 3 is a cross section taken along the line 3-3 in FIG. 2.

Referring to FIG. 1, a body frame F of the motorcycle includes a head pipe 21 at the front end thereof. A front fork 22 is steerably supported to the head pipe 21, and a front wheel WF is rotatably supported to the front fork 22. A pair of right and left main frames 23 extend rearwardly from the head pipe 21 so as to be inclined downwardly. A multicylinder engine E, e.g., four-cylinder engine, is provided which has an engine body 24. The engine body 24 is mounted on the main frames 23 on the lower side thereof.

An air cleaner 25 for cleaning the air to be supplied to the engine E is located above the engine body 24 on the rear side of the head pipe 21. A fuel tank 26 is mounted on the main frames 23 so as to cover the rear and upper portions of the air cleaner 25. Further, a radiator 27 is located on the front side of the engine body 24.

A pair of right and left seat rails 28 extend rearwardly from the rear portions of the main frames 23 so as to be inclined upwardly in such a manner that the right and left seat rails 28 are connected to the right and left main frames 23, respectively. A main seat 29 for a rider is supported on the seat rails 28 on the rear side of the fuel tank 26, and a pillion seat 30 for a passenger is supported on the seat rails 28 on the rear side of the main seat 29 at a separate position.

An exhaust system 31 connected to the engine body 24 extends downwardly from the front end of the engine body 24 and further extends rearwardly under the engine body 24 on the right side of the vehicle body toward a position between a rear wheel WR and the engine body 24. The exhaust system 31 is bent at this position to extend upwardly behind the engine body 24 and to further extend rearwardly above the rear wheel WR.

A pair of right and left pivot plates 32 extend downwardly from the rear portions of the main frames 23 so as to be connected thereto. A swing arm 33 is pivotably supported at its front end through a shaft 34 to the vertically intermediate portions of the pivot plates 32. The rear wheel WR is rotatably supported to the rear ends of the swing arm 33. A link mechanism 35 is provided between the lower portions of the pivot plates 32 and the swing arm 33. A rear cushion unit 36 is connected at its upper end to a bracket 33a provided at the front portion of the swing arm 33. The lower end of the rear cushion unit 36 is connected to the front portion of a link 37 constituting a part of the link mechanism 35.

A transmission 72, see FIG. 3, is accommodated in a crankcase 61 of the engine body 24, and power from a counter shaft 74 in the transmission 72 is transmitted through chain drive means 41 to the rear wheel WR.

The chain drive means 41 is composed of a drive sprocket 42 fixed to the counter shaft 74, a driven sprocket 43 fixed to the rear wheel WR, and an endless chain 44 wrapped between the drive sprocket 42 and the driven sprocket 43. The chain drive means 41 is arranged on the left side of the engine E with respect to a forward running direction of the motorcycle.

The front side of the head pipe 21 is covered with a front cowl 45 formed of synthetic resin. The right and left sides of the front portion of the vehicle body are covered with a center cowl 46 formed of synthetic resin. The center cowl 46 is continuously connected to the front cowl 45. The right and left sides of the engine body 24 are covered with a lower cowl 47 formed of synthetic resin. The lower cowl 47 is continuously connected to the center cowl 46. The rear portion of the seat rails 28 is covered with a rear cowl 48. A front fender 49 for covering the upper side of the front wheel WF is mounted to the front fork 22, and a rear fender 50 for covering the upper side of the rear wheel WR is mounted to the seat rails 28.

Referring to FIGS. 2 and 3, the engine body 24, mounted on the body frame F, has a cylinder axis C inclined upwardly to the front side of the vehicle. The engine body 24 includes a cylinder block 59, a lower case 60, an oil pan 62, a cylinder head 63, and a head cover 64. The cylinder block 59 has a cylinder barrel 57 formed with four cylinder bores 56 arranged in a line and an upper case 58 integrally continuing to the lower end of the cylinder barrel 57. The lower case 60 is joined to the lower end of the cylinder block 59 and constitutes a crankcase 61 in cooperation with the upper case 58. The oil pan 62 is joined to the lower end of the lower case 60, i.e., the lower end of the crankcase 61. The cylinder head 63 is joined to the upper end of the cylinder block 59. The head cover 64 is joined to the upper end of the cylinder head 63.

A crankshaft 67 extends in the lateral direction of the vehicle, and a piston 65 is slidably fitted in each cylinder bore 56. Each piston 65 is connected through a connecting rod 66 to the crankshaft 67. The crankshaft 67 is rotatably supported relative to a plurality of crank journal walls 68 provided in the crankcase 61. A crank chamber 168 is defined between any adjacent ones of the crank journal walls 68.

An overrunning clutch 69 is mounted on one end portion of the crankshaft 67 projecting from the crank journal wall 68 provided on one axial side of the crankshaft 67, e.g., the right side with respect to the forward running direction of the motorcycle in this preferred embodiment. As is well known in the art, the overrunning clutch 69 functions to input a rotational power from a starting motor 70, see FIG. 2, to the crankshaft 67. The starting motor 70 has an axis of rotation parallel to the axis of the crankshaft 67 and is mounted to the upper case 58 of the crankcase 61 in the engine body 24. A starting gear drive mechanism 71 is provided between the starting motor 70 and the overrunning clutch 69.

An output from the crankshaft 67 is shifted in speed by the transmission 72 and transmitted to the rear wheel WR as a drive wheel. The transmission 72 includes a main shaft 73 having an axis parallel to the axis of the crankshaft 67 and rotatably supported to the upper case 58 of the crankcase 61, a counter shaft 74 having an axis parallel to the axis of the main shaft 73 and rotatably supported between the upper case 58 and the lower case 60, and a plurality of shift gear trains provided between the main shaft 73 and the counter shaft 74 and adapted to selectively establish a plurality of gear ratios. The drive sprocket 42 constituting a part of the chain drive means 41 is fixed to one end portion of the counter shaft 74 projecting from the crankcase 61.

A starting clutch 75 is mounted on one end of the main shaft 73 so as to be interposed between the crankshaft 67 and the main shaft 73. When the starting clutch 75 is engaged according to a shift operation by the rider, power from the crankshaft 67 is transmitted to the main shaft 73.

The overrunning clutch 69 and the starting clutch 75 are located outside of one side wall of the cylinder block 59 and the lower case 60 on one axial side of the crankshaft 67, e.g., the right side wall with respect to the forward running direction of the motorcycle in this preferred embodiment. A cover 76 for covering the overrunning clutch 69 and the starting clutch 75 is fastened to the above one side wall of the cylinder block 59 and the lower case 60.

As shown in FIG. 3, the other end portion of the crankshaft 67 projects from the other side wall of the cylinder block 59 on the other axial side of the crankshaft 67, and a generator cover 77 is fastened to the other side wall of the cylinder block 59 so as to define a generator chamber 78 between the cylinder block 59 and the generator cover 77. Accordingly, the other end portion of the crankshaft 67 projects into the generator chamber 78. A rotor 79 is fixed to the other end portion of the crankshaft 67 in the generator chamber 78, and a stator 80 is fixed to the inner surface of the generator cover 77 so as to be surrounded by the rotor 79. Thus, the rotor 79 and the stator 80 constitute a generator 81.

A combustion chamber 83 is defined between the cylinder barrel 57 of the cylinder block 59 and the cylinder head 63 in such a manner that the top of each piston 65 is exposed to the combustion chamber 83. The cylinder head 63 is operatively provided with two inlet valves 84 and two exhaust valves (not shown) for each combustion chamber 83. Each inlet valve 84 is biased by a valve spring 86 in a valve closing direction, and each exhaust valve is also biased by a valve spring (not shown) in a valve closing direction.

A lifter 88 abutting against the top of each inlet valve 84 is slidably fitted to the cylinder head 63 so as to slide along the operational axis of each inlet valve 84. Similarly, a lifter (not shown) abutting against the top of each exhaust valve is slidably fitted to the cylinder head 63 so as to slide along the operational axis of each exhaust valve. An inlet camshaft 92 having a plurality of cams 90 is provided above the inlet valves 84 in such a manner that each cam 90 is in sliding contact with the corresponding lifter 88.

The cylinder head 63 is integrally formed with cam journal walls 94 and 95, and cam holders 96 and 97 are fastened to the cam journal walls 94 and 95, respectively. The inlet camshaft 92 is rotatably supported between the cam journal walls 94 and 95 and the cam holders 96 and 97.

Rotational power from the crankshaft 67 is transmitted through a timing drive device 100 to the inlet camshaft 92 and an exhaust camshaft 93 with the rotational speed of the crankshaft 67 being reduced to ½. The timing drive device 100 includes a drive sprocket 101 fixed to the crankshaft 67 at a portion between the crank journal wall 68 on one axial side of the crankshaft 67 and the overrunning clutch 69, an inlet driven sprocket 102 fixed to one end of the inlet camshaft 92, an exhaust driven sprocket (not shown) fixed to one end of the exhaust camshaft 93, and an endless cam chain 104 wrapped among the drive sprocket 101, the inlet driven sprocket 102, and the exhaust driven sprocket.

An oil pump 82 having an axis of rotation parallel to the axis of the crankshaft 67 is mounted on the lower case 60 of the crankcase 61. Oil stored in the oil pan 62 is lifted through an oil strainer 130 by the oil pump 82, and the oil is discharged from the oil pump 82 to a discharge passage 131 provided in the lower case 60.

Figure 4:
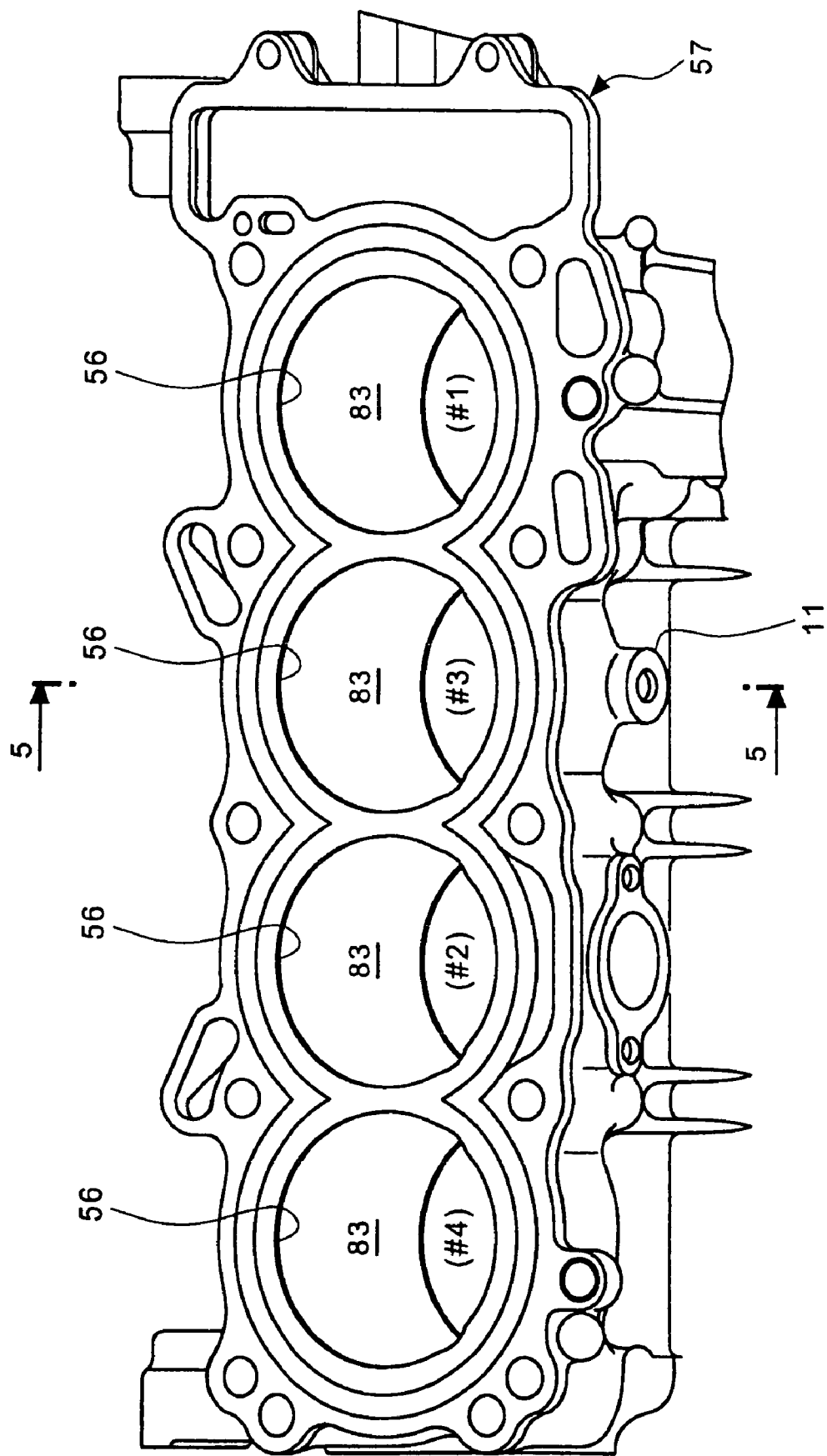
FIG. 4 is a perspective view of a cylinder barrel of a cylinder block.
Figure 5:
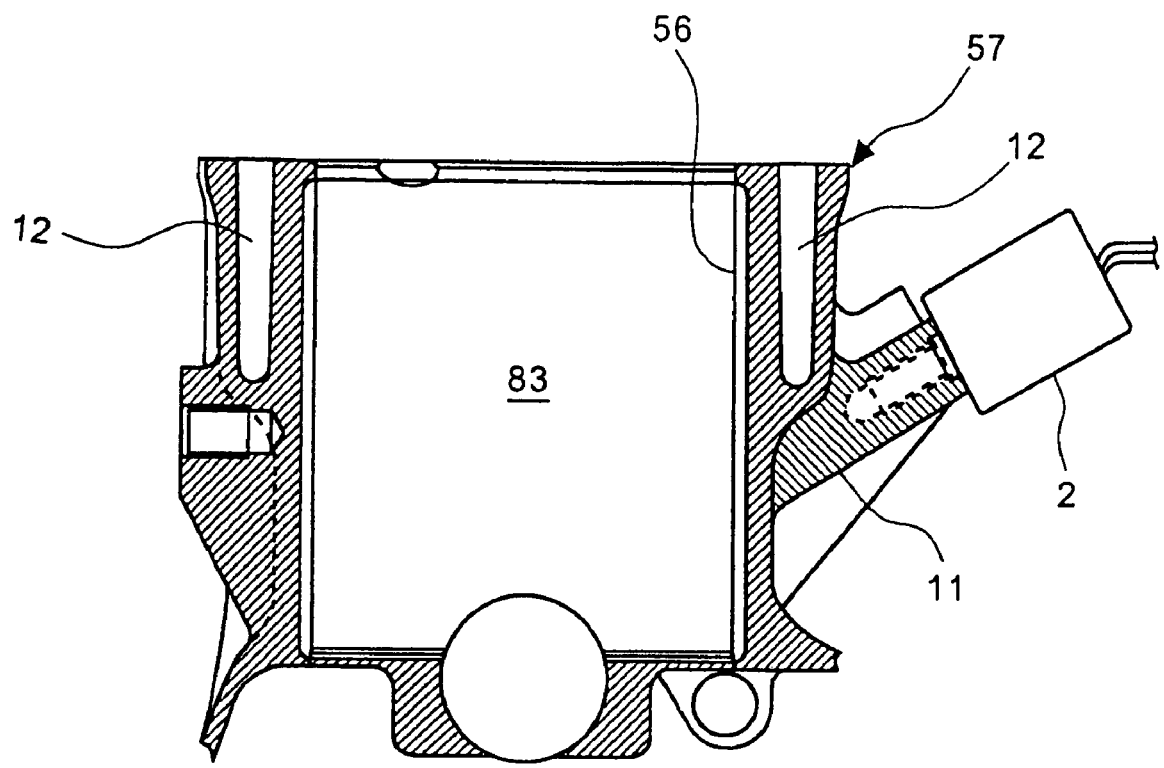
FIG. 5 is a cross section taken along the line 5-5 in FIG. 5.

FIG. 4 is a perspective view of the cylinder barrel 57, and FIG. 5 is a cross section taken along the line 5-5 in FIG. 4. In FIGS. 4 and 5, the same reference numerals as those shown in FIGS. 1 to 3 denote the same or like parts.

As shown in FIGS. 4 and 5, the cylinder barrel 57 is formed with a knock sensor base 11 on the side surface of only the third cylinder (#3), and a vibration type knock sensor 2 is mounted on the knock sensor base 11. A water jacket 12 is formed in an upper portion of the wall of the cylinder barrel 57. The knock sensor base 11 is formed below the water jacket 12 so as to prevent a problem such that knocking vibrations may be absorbed by the cooling water in the water jacket 12 to cause a reduction in sensitivity of the knock sensor 2.

Accordingly, the knock sensor 2 is located so as to avoid the water jacket 12, so that it is possible to prevent the problem that knocking vibrations may be absorbed by the cooling water to cause a reduction in sensitivity of the knock sensor 2. Furthermore, since the knock sensor 2 is located below the water jacket 12 so as to be spaced apart from the inlet and exhaust valves, the influence of valve seating noise can be reduced.

Figure 6:
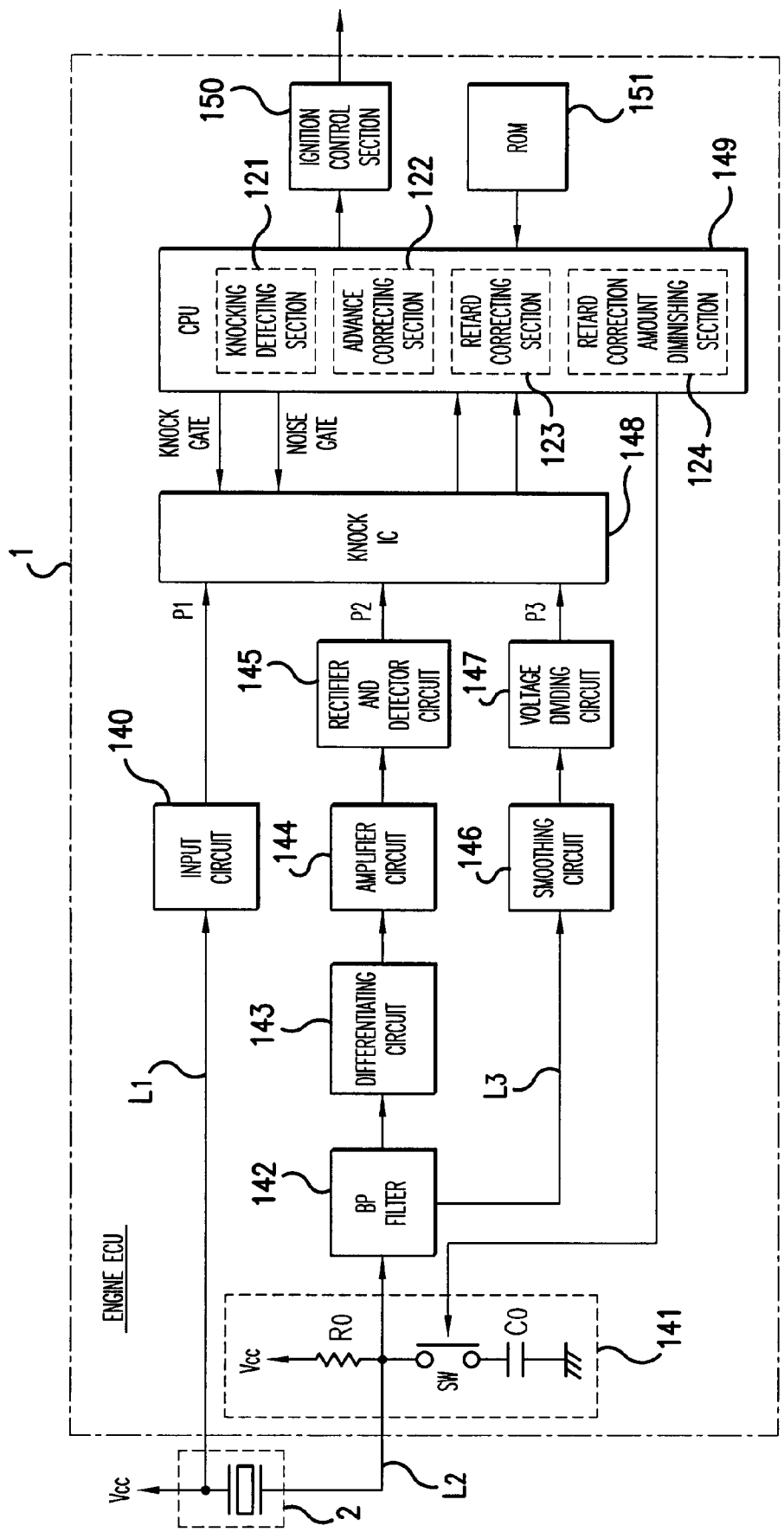
FIG. 6 is a functional block diagram of an engine ECU containing the knocking control device of the present invention.

FIG. 6 is a functional block diagram showing the configuration of a main part of an engine ECU 1 containing the knocking control device according to the present invention.

A break detection line L1 connected to a feeder line of the knock sensor 2 is passed through an input circuit 140 and input to a break detection port P1 of a knock IC 148. A signal line L2 connected to an output line of the knock sensor 2 is passed through an amplitude diminishing section 141, characteristic of the present invention, a band pass (BP) filter 142, a differentiating circuit 143, an amplifier circuit 144, and a rectifier and detector circuit 145 and input to a signal input port P2 of the knock IC 148. A low frequency component obtained by removing a high frequency component in the BP filter 142 is passed through a fail detection line L3, a smoothing circuit 146, and a voltage dividing circuit 147 and input to a fail detection port P3 of the knock IC 148.

The amplitude diminishing section 141 is configured by connecting a resistance component R0, a switch SW, and a capacitance component C0 in series between a power supply Vcc and a ground so that these components R0, SW, and C0 are arranged in this order from the power supply Vcc. The signal line L2 is connected to a connection point between the resistance component R0 and the switch SW. The switch SW is turned on by a CPU 149 when the engine speed is in a predetermined high speed range. Accordingly, when the engine speed is in the predetermined high speed range, the amplitude of an output from the knock sensor 2 is limited.

An ignition control section 150 performs ignition for each cylinder at the ignition timing informed from the CPU 149. A ROM 151 preliminarily stores nonvolatile data such as reference ignition timing tref, ignition timing correction amount Δta, retard correction amount Δtb, and retard diminishment amount Δtc.

The CPU 149 outputs to the knock IC 148 a knock gate signal for opening and closing a knock gate and a noise gate signal for opening and closing a noise gate, and receives from the knock IC 148 a knock signal and a noise signal sampled during the respective gate periods.

The CPU 149 includes a knocking detecting section 121 for detecting the occurrence of knocking according to the knock signal and the noise signal received from the knock IC 148, an advance correcting section 122 for advancing the ignition timing for the specific cylinder to which the knock sensor 2 is mounted as compared with the ignition timing for the other cylinders at the time knocking does not occur, thereby facilitating the occurrence of knocking in the above specific cylinder as compared with the other cylinders, a retard correcting section 123 for retarding the ignition timing for all of the cylinders at the time knocking occurs as compared with the ignition timing in the condition where knocking is not detected, thereby eliminating the occurrence of knocking, and a retard correction amount diminishing section 124 for gradually returning the retarded ignition timing of each cylinder to the reference ignition timing obtained before the above retard correction after eliminating the occurrence of knocking.

In the case that a vibrational component calculated by subtracting a peak value of the noise signal as a background level (a vibrational component at the time knocking does not occur) from a peak value of the knock signal is greater than a predetermined knocking determination level, the knocking detecting section 121 determines that knocking has occurred. Conversely, in the case that the vibrational component calculated above is less than or equal to the predetermined knocking determination level, the knocking detecting section 121 determines that knocking has not occurred.

Figure 7:
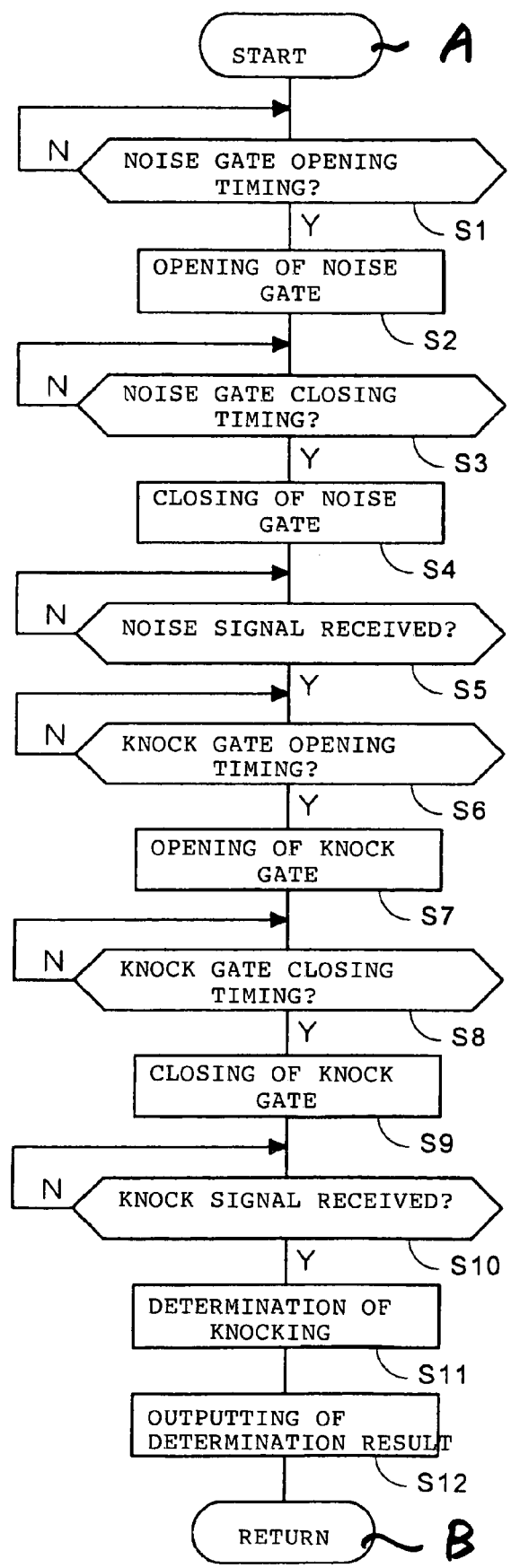
FIG. 7 is a flowchart showing the operation of the knocking control device of the present invention.
Figure 8:
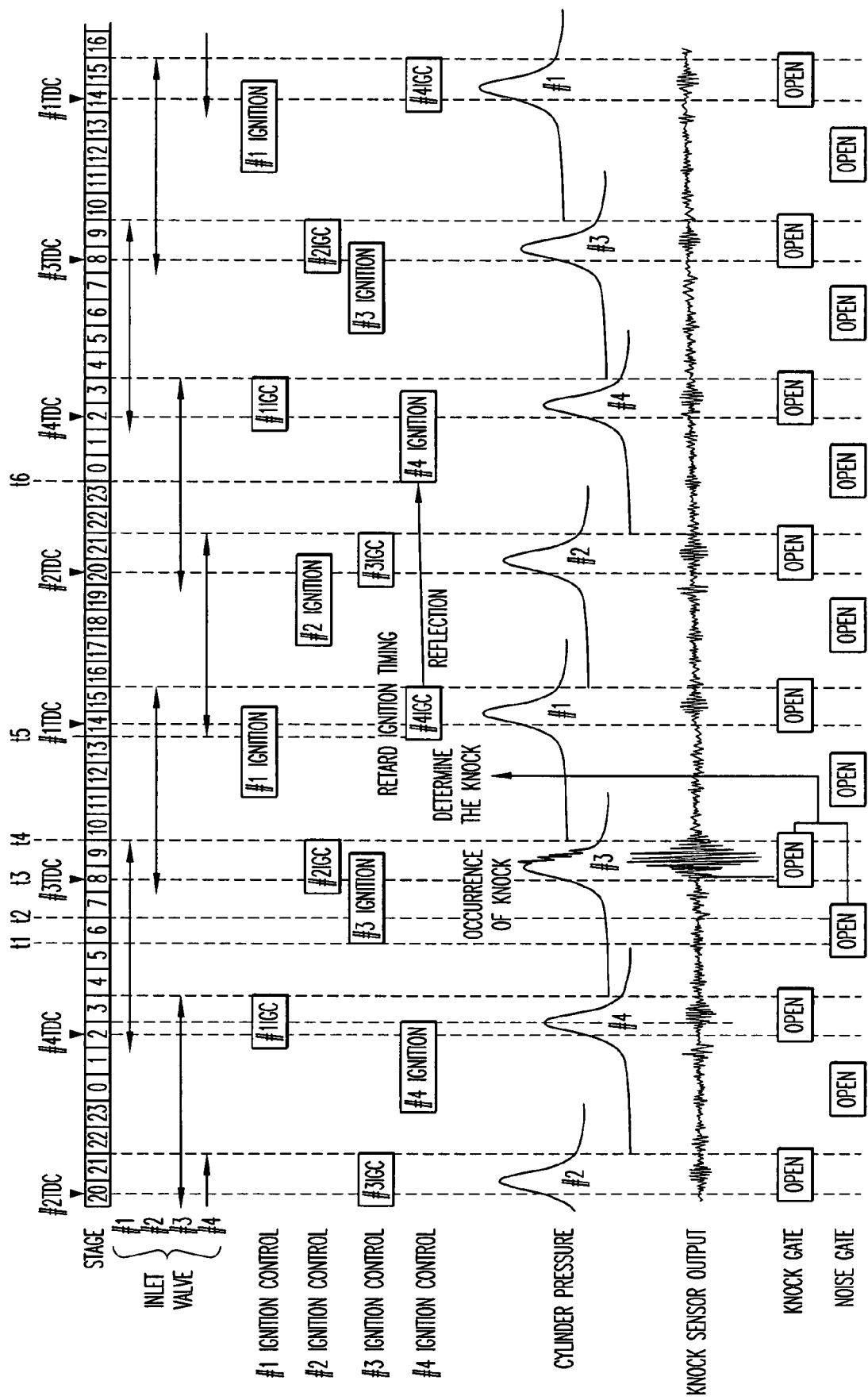
FIG. 8 is a timing chart showing the operation of the knocking control device of the present invention.

FIG. 7 is a flowchart showing the operation of the knocking control device according to the present invention, and FIG. 8 is a timing chart showing the operation of the knocking control device according to the present invention. In the following description, the operation of the knocking detecting section 121 in the CPU 149 is focused. In this preferred embodiment, as shown in FIG. 8, one cycle of the four-stroke cycle engine (two revolutions of the crankshaft) is divided into 24 stages arranged from the stage number "0" to the stage number "23", and various kinds of control are performed according to the stage number.

In step S1, it is determined whether or not the opening timing of the noise gate for any cylinder has been reached according to the stage number. In this preferred embodiment, when the stage number is "12", the opening timing of the noise gate for the first cylinder (#1) is determined. Similarly, when the stage number is "18," the opening timing of the noise gate for the second cylinder (#2) is determined. When the stage number is "6," the opening timing of the noise gate for the third cylinder (#3) is determined. When the stage number is "0," the opening timing of the noise gate for the fourth cylinder (#4) is determined. Accordingly, when stage number "6" is detected at the time t1 shown in FIG. 8, the opening timing of the noise gate for the third cylinder is determined, and the program proceeds to step S2, in which a noise gate opening signal is output from the CPU 149 to the knock IC 148.

In the knock IC 148, an output signal from the knock sensor 2 starts to be input in response to the noise gate opening signal from the CPU 149. In this preferred embodiment, the knock sensor 2 is provided for only the third cylinder. Accordingly, even when knocking does not occur in the third cylinder because of misfire or the like, knocking determination is also performed for the first, second, and fourth cylinders to allow knocking control according to any cylinders other than the third cylinder.

In step S3, it is determined whether or not the closing timing of the noise gate has been reached according to the stage number. Until the closing timing is determined, the noise gate opening signal continues to be output, so that the inputting of the output signal from the knock sensor 2 to the knock IC 148 is continued.

When the next stage number "7" is detected at the time t2, the closing timing of the noise gate for the third cylinder is determined in step S3, and the program proceeds to step S4, in which a noise gate closing signal is output from the CPU 149 to the knock IC 148. In the knock IC 148, the inputting of the output signal from the knock sensor 2 is stopped in response to the noise gate closing signal from the CPU 149. In step S5, the CPU 149 waits for the reception of a noise signal from the knock IC 148, and when receiving the noise signal, the program proceeds to step S6.

In step S6, it is determined whether or not the opening timing of the knock gate for the third cylinder being monitored has been reached according to the stage number and the TDC timing. When the TDC timing for the third cylinder has been reached at the time t3, the opening timing of the knock gate is determined and the program proceeds to step S7, in which a knock gate opening signal is output from the CPU 149 to the knock IC 148. In the knock IC 148, the inputting of the output signal from the knock sensor 2 is started in response to the knock gate opening signal from the CPU 149. In step S8, it is determined whether or not the closing timing of the knock gate has been reached according to the stage number. Until the closing timing of the knock gate is determined, the knock gate opening signal continues to be output, so that the inputting of the output signal from the knock sensor 2 to the knock IC 148 is continued.

When the next stage number "10" is detected at the time t4, the closing timing of the knock gate for the third cylinder is determined in step S8, and the program proceeds to step S9, in which a knock gate closing signal is output from the CPU 149 to the knock IC 148. In the knock IC 148, the inputting of the output signal from the knock sensor 2 is stopped in response to the knock gate closing signal from the CPU 149. In step S10, the CPU 149 waits for the reception of a knock signal from the knock IC 148, and when receiving the knock signal, the program proceeds to step S11.

In step S11, the occurrence or nonoccurrence of knocking is determined by a known method according to the noise signal and the knock signal received from the knock IC 148. In step S12, the result of this determination is output to the ignition control section 150 and reflected on "the setting period (#4IGC) for the ignition timing for the fourth cylinder" started at the time t5 corresponding to the stage number "14." The ignition timing set in this setting period is reflected on "the ignition period (#4 ignition) for the fourth cylinder" started at the time t6 corresponding to the stage number "0." Accordingly, the retard correction for the ignition timing is effected from this time.

Figure 9:
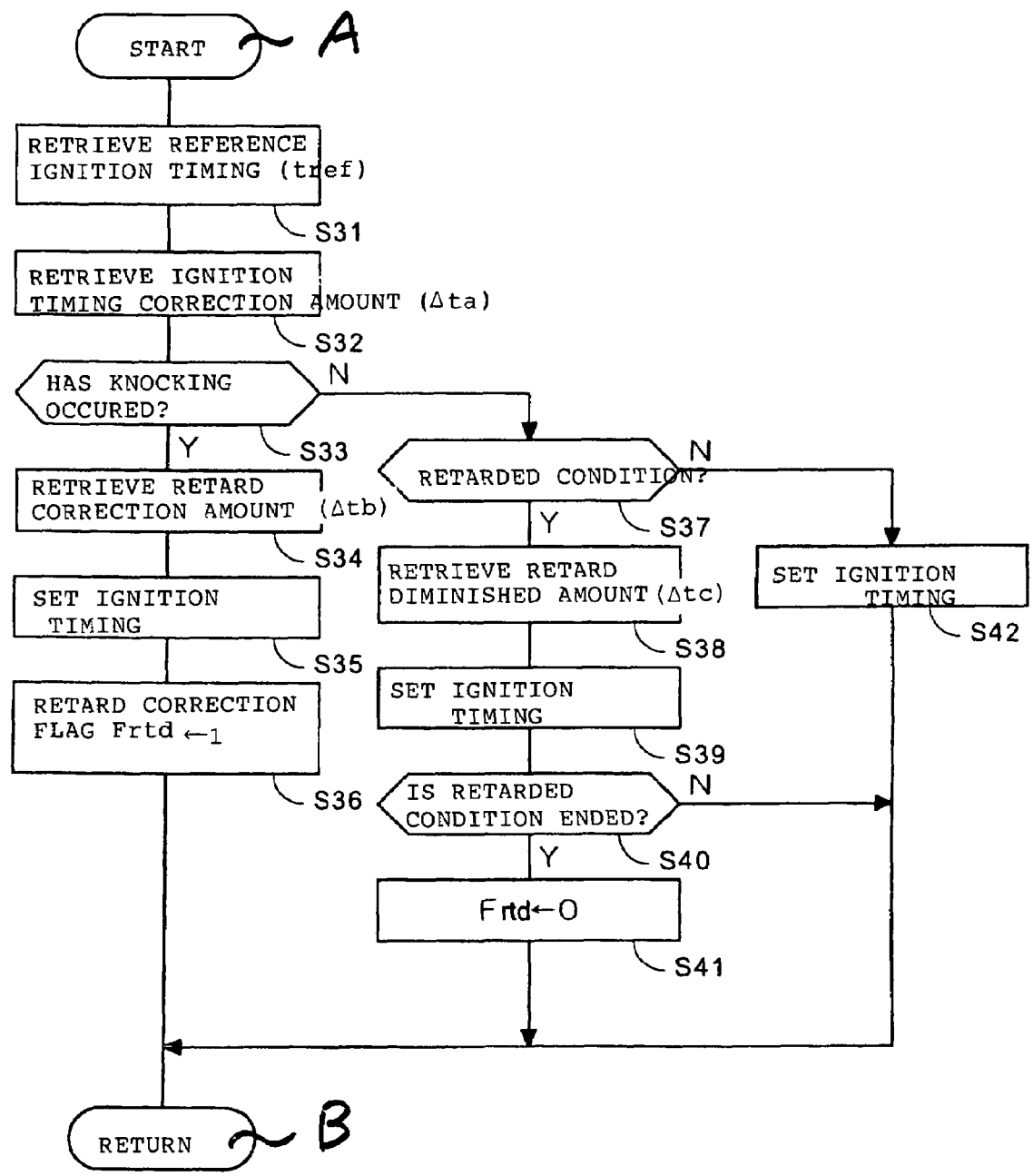
FIG. 9 is a flowchart of ignition timing control according to the present invention.

Ignition timing control by the CPU 149 will now be described with reference to the flowchart shown in FIG. 9.

In step S31, the reference ignition timing tref is retrieved from the ROM 151 by the advance correcting section 122. The reference ignition timing tref is set as the ignition timing for the third cylinder advanced from the ignition timing for each of the first, second, and fourth cylinders, so as to facilitate knocking in the third cylinder as compared with the first, second, and fourth cylinders. In step S32, the ignition timing correction amount Δta according to a cooling water temperature and an engine speed is retrieved from the ROM 151. In step S33, it is determined whether or not knocking has occurred.

If the answer in step S33 is negative, the program proceeds through step S37 to step S42. In step S42, ignition timing is set according to the reference ignition timing tref retrieved in step S31 and the ignition timing correction amount Δta retrieved in step S32.

If knocking has occurred in any one of the first to fourth cylinders and the occurrence of knocking is detected in step S33, the program proceeds to step S34, in which the retard correction amount Δtb is retrieved from the ROM 151 by the retard correcting section 122. In step S35, the ignition timing is retarded according to the reference ignition timing tref, the ignition timing correction amount Δta, and the retard correction amount Δtb. In step S36, a retard correction flag Frtd indicating that the ignition timing has retarded is set.

If the knocking has been eliminated by the effect of the retard correction for the ignition timing and the nonoccurrence of knocking is detected in step S33, the program proceeds to step S37, in which it is determined whether or not the ignition timing is in the retarded condition according to the retard correction flag Frtd. If the answer in step S37 is affirmative, the program proceeds to step S38, in which the retard diminishment amount Δtc is retrieved from the ROM 151 by the retard correction amount diminishing section 124. In step S39, the retard amount is subtracted by the retard diminishment amount Δtc from the previous ignition timing to set the present ignition timing. In other words, the previous ignition timing is advanced by the retard diminishment amount Δtc to set the present ignition timing.

In step S40, it is determined whether or not the retard correction amount included in the ignition timing set in steps S34 and S35 during the occurrence of knocking has been canceled by the retard diminishment amount Δtc. If the answer in step S40 is negative, the above processing is repeated to diminish the retard correction amount by the retard diminishment amount Δtc in each cycle of the routine. If the answer in step S40 thereafter becomes affirmative, the program proceeds to step S41, in which the retard correction flag Frtd is reset. Thereafter, the program proceeds through steps S31 to S32 and S37 to step S42, so that the ignition timing for the third cylinder is returned to the reference ignition timing with which knocking occurs more easily than the first, second, and fourth cylinders.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A knocking control device for controlling knocking in a multicylinder engine having a plurality of cylinders, comprising:
   a knock sensor located to correspond to a specific one of said cylinders;
   advance correcting means for advancing the ignition timing for said specific cylinder as compared with the ignition timing for the other cylinders;
   knocking detecting means for detecting knocking according to an output signal from said knock sensor; and
   retard correcting means for retarding the ignition timing for each cylinder when knocking is detected.

2. The knocking control device according to claim 1, wherein said multicylinder engine is an in-line engine and said specific cylinder is any one of said cylinders of said in-line engine other than the opposite two cylinders.

3. The knocking control device according to claim 2, and further comprising retard correction amount diminishing means for gradually returning the retarded ignition timing for each cylinder to the advanced ignition timing obtained before the retard correction by said retard correcting means.

4. The knocking control device according to claim 3, wherein said knocking detecting means comprises amplitude diminishing means for diminishing the amplitude of a signal input from said knock sensor.

5. The knocking control device according to claim 4, wherein said amplitude diminishing means diminishes the amplitude of said input signal according to an engine speed.

6. The knocking control device according to claim 2, wherein said multicylinder engine has a cylinder body formed with a water jacket and said knock sensor is mounted on said cylinder body at a position avoiding said water jacket.

7. The knocking control device according to claim 6, wherein said knock sensor is located below said water jacket.

8. The knocking control device according to claim 2, wherein said knocking detecting means comprises amplitude diminishing means for diminishing the amplitude of a signal input from said knock sensor.

9. The knocking control device according to claim 8, wherein said amplitude diminishing means diminishes the amplitude of said input signal according to an engine speed.

10. The knocking control device according to claim 1, and further comprising retard correction amount diminishing means for gradually returning the retarded ignition timing for each cylinder to the advanced ignition timing obtained before the retard correction by said retard correcting means.

11. The knocking control device according to claim 10, wherein said multicylinder engine has a cylinder body formed with a water jacket and said knock sensor is mounted on said cylinder body at a position avoiding said water jacket.

12. The knocking control device according to claim 11, wherein said knock sensor is located below said water jacket.

13. The knocking control device according to claim 10, wherein said knocking detecting means comprises amplitude diminishing means for diminishing the amplitude of a signal input from said knock sensor.

14. The knocking control device according to claim 13, wherein said amplitude diminishing means diminishes the amplitude of said input signal according to an engine speed.

15. The knocking control device according to claim 1, wherein said multicylinder engine has a cylinder body formed with a water jacket and said knock sensor is mounted on said cylinder body at a position avoiding said water jacket.

16. The knocking control device according to claim 15, wherein said knock sensor is located below said water jacket.

17. The knocking control device according to claim 15, wherein said knocking detecting means comprises amplitude diminishing means for diminishing the amplitude of a signal input from said knock sensor.

18. The knocking control device according to claim 1, wherein said knocking detecting means comprises amplitude diminishing means for diminishing the amplitude of a signal input from said knock sensor.

19. The knocking control device according to claim 18, wherein said amplitude diminishing means diminishes the amplitude of said input signal according to an engine speed.

20. The knocking control device according to claim 19, wherein said amplitude diminishing means has a diminishing rate increasing with an increase in engine speed.

\* \* \* \* \*